(12) United States Patent
Shaqqo et al.

(10) Patent No.: US 11,843,325 B2
(45) Date of Patent: Dec. 12, 2023

(54) CROWBAR MODULE FOR AN ACTIVE NEUTRAL POINT CLAMPED POWER CONVERSION ASSEMBLY

(71) Applicant: General Electric Company, Schenectady, NY (US)

(72) Inventors: Bacil Shaqqo, Roanoke, VA (US); Fernando Arturo Ramirez Sanchez, Salem, VA (US); Nathaniel Robert Michener, Roanoke, VA (US); Steven Wade Sutherland, Roanoke, VA (US)

(73) Assignee: General Electric Company, Schenectady, NY (US)

( * ) Notice: Subject to any disclaimer, the term of this patent is extended or adjusted under 35 U.S.C. 154(b) by 176 days.

(21) Appl. No.: 17/000,435

(22) Filed: Aug. 24, 2020

(65) Prior Publication Data
US 2022/0060123 A1    Feb. 24, 2022

(51) Int. Cl.
*H02M 7/487* (2007.01)
*F03D 9/25* (2016.01)
*H02P 9/00* (2006.01)
*H02P 9/10* (2006.01)
*H02P 101/15* (2016.01)

(52) U.S. Cl.
CPC ............ *H02M 7/487* (2013.01); *F03D 9/255* (2017.02); *H02P 9/007* (2013.01); *H02P 9/102* (2013.01); *H02P 2101/15* (2015.01)

(58) Field of Classification Search
CPC ........ H02M 7/487; F03D 9/255; H02P 9/007; H02P 9/102; H02P 2101/15
See application file for complete search history.

(56) References Cited

U.S. PATENT DOCUMENTS

| | | | |
|---|---|---|---|
| 1,499,009 | A | 6/1924 | Frantsits |
| 7,102,247 | B2 | 9/2006 | Feddersen |
| 7,573,732 | B2 | 8/2009 | Teichmann et al. |
| 7,786,608 | B2 | 8/2010 | Menke |

(Continued)

FOREIGN PATENT DOCUMENTS

| CN | 101651330 A | 2/2010 |
|---|---|---|
| CN | 201623465 U | 11/2010 |

(Continued)

OTHER PUBLICATIONS

European Search Report for EP Application No. 21192354.5, dated Jan. 20, 2022.

(Continued)

*Primary Examiner* — Sean Gugger
(74) *Attorney, Agent, or Firm* — Dority & Manning, P.A.

(57) ABSTRACT

A method for operating a multi-level bridge power converter of an electrical power system connected to a power grid includes receiving, via a controller of the power converter, an indication of a transient event occurring in the power grid or the electrical power system. The power converter has a plurality of switching devices arranged in an active neutral point clamped topology. Accordingly, upon receiving the indication, the method includes activating a crowbar algorithm programmed in the controller of the power converter to bifurcate a current received by the power converter into a plurality of different current paths defined by the plurality of switching devices.

11 Claims, 6 Drawing Sheets

(56) References Cited

U.S. PATENT DOCUMENTS

| | | |
|---|---|---|
| 7,978,445 B2 | 7/2011 | Ritter |
| 8,154,833 B2 | 4/2012 | Ritter et al. |
| RE43,698 E | 10/2012 | Hudson |
| 8,472,153 B1 | 6/2013 | Grbovic |
| 10,090,776 B2 | 10/2018 | Basic et al. |
| 2013/0057227 A1 | 3/2013 | Aurtenetxea et al. |
| 2016/0181946 A1* | 6/2016 | Ding ............... H02M 1/32 363/56.01 |
| 2020/0099312 A1* | 3/2020 | Trainer ............... H02M 7/2173 |

FOREIGN PATENT DOCUMENTS

| | | |
|---|---|---|
| CN | 102005716 B | 7/2014 |
| EP | 1499009 B1 | 10/2007 |
| EP | 2187046 A2 | 5/2010 |
| EP | 3627645 A1 | 3/2020 |

OTHER PUBLICATIONS

Sujod Muhamad Zahim et al., A New Protection Scheme for Three-Level NPC Converter based DFIG using Zero State Control, 2013 4th IEEE PES ISGT Europe, Oct. 16, 2013, pp. 1-5.

\* cited by examiner

CROWBAR MODULE FOR AN ACTIVE NEUTRAL POINT CLAMPED POWER CONVERSION ASSEMBLY

FIELD

The present disclosure relates generally to electrical power systems, and more particularly to a crowbar module for an active neutral point clamped (ANPC) power converter of electrical power system.

BACKGROUND

Wind turbines have received increased attention as a renewable energy source. Wind turbines use the wind to generate electricity. The wind turns multiple blades connected to a rotor. The spin of the blades caused by the wind spins a shaft of the rotor, which connects to a generator that generates electricity. Certain wind turbines include a doubly-fed induction generator (DFIG) to convert wind energy into electrical power suitable for output to an electrical grid. DFIGs are typically connected to a converter that regulates the flow of electrical power between the DFIG and the grid. More particularly, the converter allows the wind turbine to output electrical power at the grid frequency regardless of the rotational speed of the wind turbine blades.

A typical DFIG system includes a wind driven DFIG having a rotor and a stator. The stator of the DFIG is coupled to the electrical grid through a stator bus. A power converter is used to couple the rotor of the DFIG to the electrical grid. The power converter can be a two-stage power converter including both a rotor side converter and a line side converter. The rotor side converter can receive alternating current (AC) power from the rotor via a rotor bus and can convert the AC power to a DC power. The line side converter can then convert the DC power to AC power having a suitable output frequency, such as the grid frequency. The AC power is provided to the electrical grid via a line bus. An auxiliary power feed can be coupled to the line bus to provide power for components used in the wind turbine system, such as fans, pumps, motors, and other components of the wind turbine system.

Under certain conditions (e.g., transient power conditions), a high power mismatch between the rotor and the grid connection temporally exists and voltage transients become amplified such that a DC link voltage level can increase above normal allowed or rated levels. To absorb or deflect power during such excessive power level conditions, known systems utilize a fast acting shorting means, such as a crowbar circuit, between the rotor terminals of the DFIG and the rotor converter. In operation, these shorting devices provide a short circuit at the rotor terminals to prevent excess power from flowing to the rotor converter.

Though dissipating the excess energy from the transient events via the crowbar circuit will lower the DC link voltage, large current transients are also created that stress the switching devices of the power converter. This stress is generally a function of the duration and the magnitude of current. Thus, if the transient event lasts too long or is too severe, then it is impossible to avoid either exceeding the current rating of the dissipating devices for too long or dissipating so slowly that the voltage rating is exceeded.

Accordingly, the present disclosure is directed to a power conversion assembly that addresses the aforementioned issues. In particular, the present disclosure is directed to an active neutral point clamped three-level power conversion assembly having alternating current (AC) terminals that are crowbarred via two sets of middle point switching devices.

BRIEF DESCRIPTION

Aspects and advantages of the invention will be set forth in part in the following description, or may be obvious from the description, or may be learned through practice of the invention.

In one aspect, the present disclosure is directed to a method for operating a multi-level bridge power converter of an electrical power system connected to a power grid. The power converter includes a first converter coupled to a second converter via a DC link. The power converter has a plurality of switching devices arranged in an active neutral point clamped topology. The method includes receiving, via a controller of the power converter, an indication of a transient event occurring in the power grid or the electrical power system. Upon receiving the indication, the method includes activating a crowbar algorithm programmed in the controller of the power converter to bifurcate a current received by the power converter into a plurality of different current paths defined by the plurality of switching devices.

In an embodiment, the plurality of switching devices may include, at least, a first set of middle point switching devices and a second set of middle point switching devices. In particular embodiments, the plurality of switching devices may include insulated gate bipolar transistors (IGBTs).

In further embodiments, activating the crowbar algorithm programmed in the controller of the power converter to bifurcate the current received by the power converter into multiple current paths defined by plurality of switching devices may include directing the current through a first current path defined by the first set of middle point switching devices, monitoring a temperature of the first set of middle point switching devices, comparing the temperature to a temperature threshold, and directing the current through a second current path defined by the second set of middle point switching devices when the temperature exceeds the temperature threshold. In certain embodiments, the first and second current paths each include different switching devices of the plurality of switching devices.

In another embodiment, the method may include switching directing of the current between the first and second sets of middle point switching devices based on the temperature.

In an embodiment, the method may also include generating, via the controller, a model of the first and second sets of middle point switching devices as a function of one or more electrical conditions, physical parameters, or time and determining the temperature of the first or second sets of middle point switching devices using the model.

In further embodiments, the method may include monitoring the temperature of the first or second sets of middle point switching devices via one or more sensors.

In alternative embodiments, activating the crowbar algorithm programmed in the controller of the power converter to bifurcate the current received by the power converter into multiple current paths defined by plurality of switching devices may include directing the current through a first current path defined by the first set of middle point switching devices and a second current path defined by the second set of middle point switching devices simultaneously.

In particular embodiments, the multi-level bridge power converter may be, at least, a three-level bridge power converter, or higher. Moreover, in an embodiment, the electrical power system may be a wind turbine power system, a solar power system, an energy storage power system or combinations thereof.

In another aspect, the present disclosure is directed to an electrical power system. The electrical power system includes a doubly-fed induction generator having a rotor and a stator. The stator provides AC power to a stator bus. The electrical power system also includes a multi-level bridge power converter coupled to the rotor of the doubly-fed induction generator. The power converter includes a first converter coupled to a second converter via a DC link. The power converter includes a plurality of switching devices arranged in an active neutral point clamped topology. Moreover, the electrical power system includes a controller configured to implement a crowbar algorithm comprising a plurality of operations, including but not limited to receiving an indication of a transient event occurring in the power grid or the electrical power system and upon receiving the indication, activating a crowbar algorithm programmed in the power converter to bifurcate a current received by the power converter into multiple current paths defined by plurality of switching devices. It should be understood that the electrical power system may further include any of the additional features described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to systems and methods for protecting a power conversion assembly from overvoltage transients. In particular, grid transients can create over voltage events on doubly-fed induction generator (DFIG) rotor circuitry. A crowbar circuit generally refers to a circuit that connects the three phases of the system together, which prevents energy from remaining in the DC structure, which would exceed the voltage rating of the capacitors and transistors. Thus, the present disclosure utilizes an active neutral point clamped three-level power conversion configuration, with the AC terminals crowbarred via two sets of middle point IGBTs. By using this algorithm and topology, the high transient currents can be sustained for a greater duration, allowing the hardware to endure more severe transients. Furthermore, by dispersing the dissipating currents, the crowbar can be sustained for a greater period before damaging the devices.

It should be appreciated that numerous advantages may be provided by configuring a power converter as described herein. Specifically, the systems and methods of the present disclosure can be applied to many electrical power systems, such as a wind turbine power system, a solar power system, an energy storage power system or combinations thereof. Further, by dissipating the currents as described herein, the stress load can be spread across more devices, which allows the system to absorb harsher transients. The ability to endure harsher transients allows for increased short circuit current potential at the terminals of the power converter. Accordingly, the ability for increased short circuit current at the terminals allows for the use of more efficient electric machines and less filtering on the generator side of the power converter.

Figure 1:
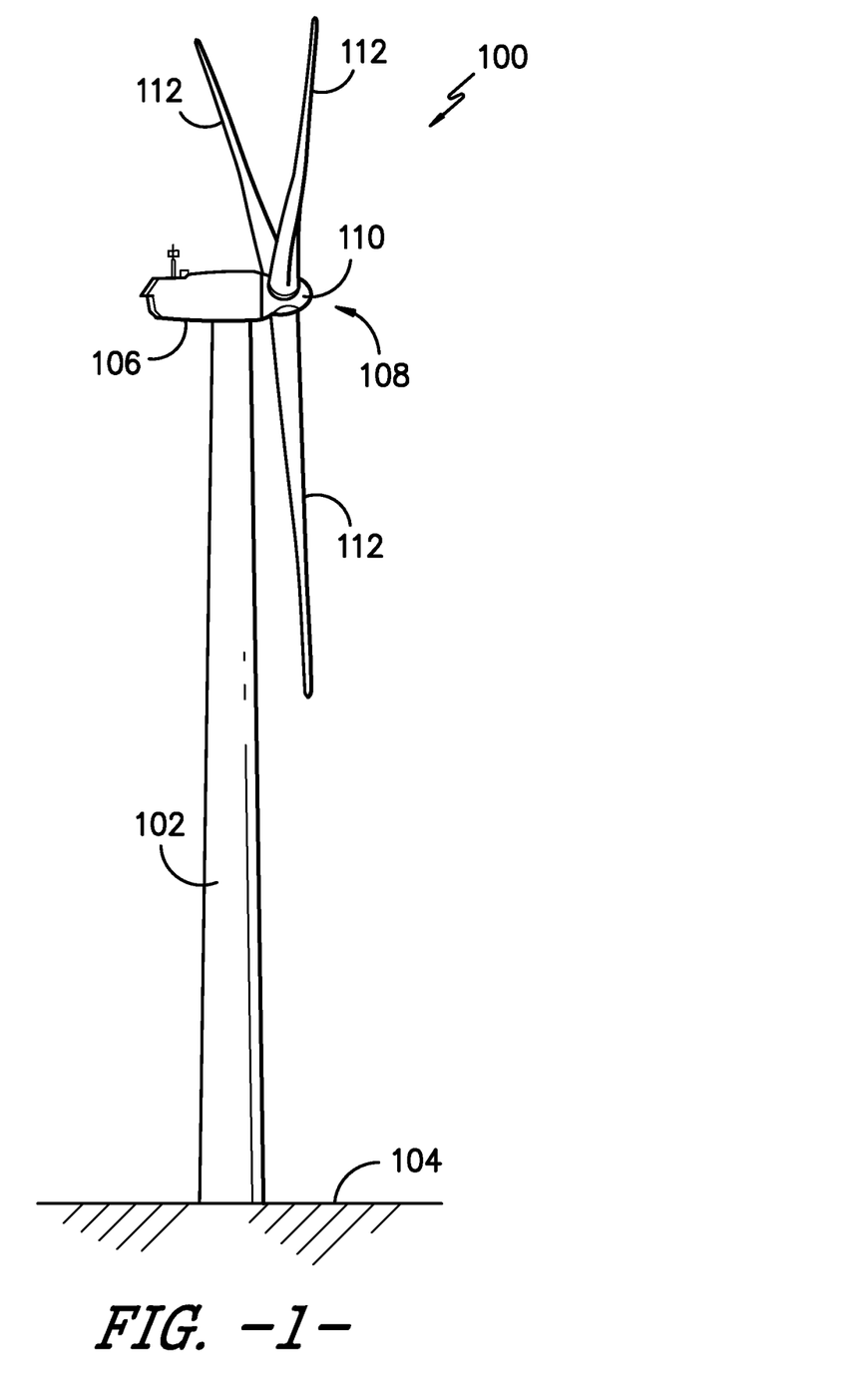
FIG. 1 illustrates a perspective view of one embodiment of a wind turbine according to the present disclosure.

Referring now to the drawings, FIG. 1 illustrates a perspective view of one embodiment of a wind turbine 100. As shown, the wind turbine 100 generally includes a tower 102 extending from a support surface 104, a nacelle 106 mounted on the tower 102, and a rotor 108 coupled to the nacelle 106. The rotor 108 includes a rotatable hub 110 and at least one rotor blade 112 coupled to and extending outwardly from the hub 10. For example, in the illustrated embodiment, the rotor 108 includes three rotor blades 112. However, in an alternative embodiment, the rotor 108 may include more or less than three rotor blades 112. Each rotor blade 112 may be spaced about the hub 110 to facilitate rotating the rotor 108 to enable kinetic energy to be transferred from the wind into usable mechanical energy, and subsequently, electrical energy. For instance, as will be described below, the rotor 108 may be rotatably coupled to an electric generator 220 (FIG. 2) to permit electrical energy to be produced.

Figure 2:
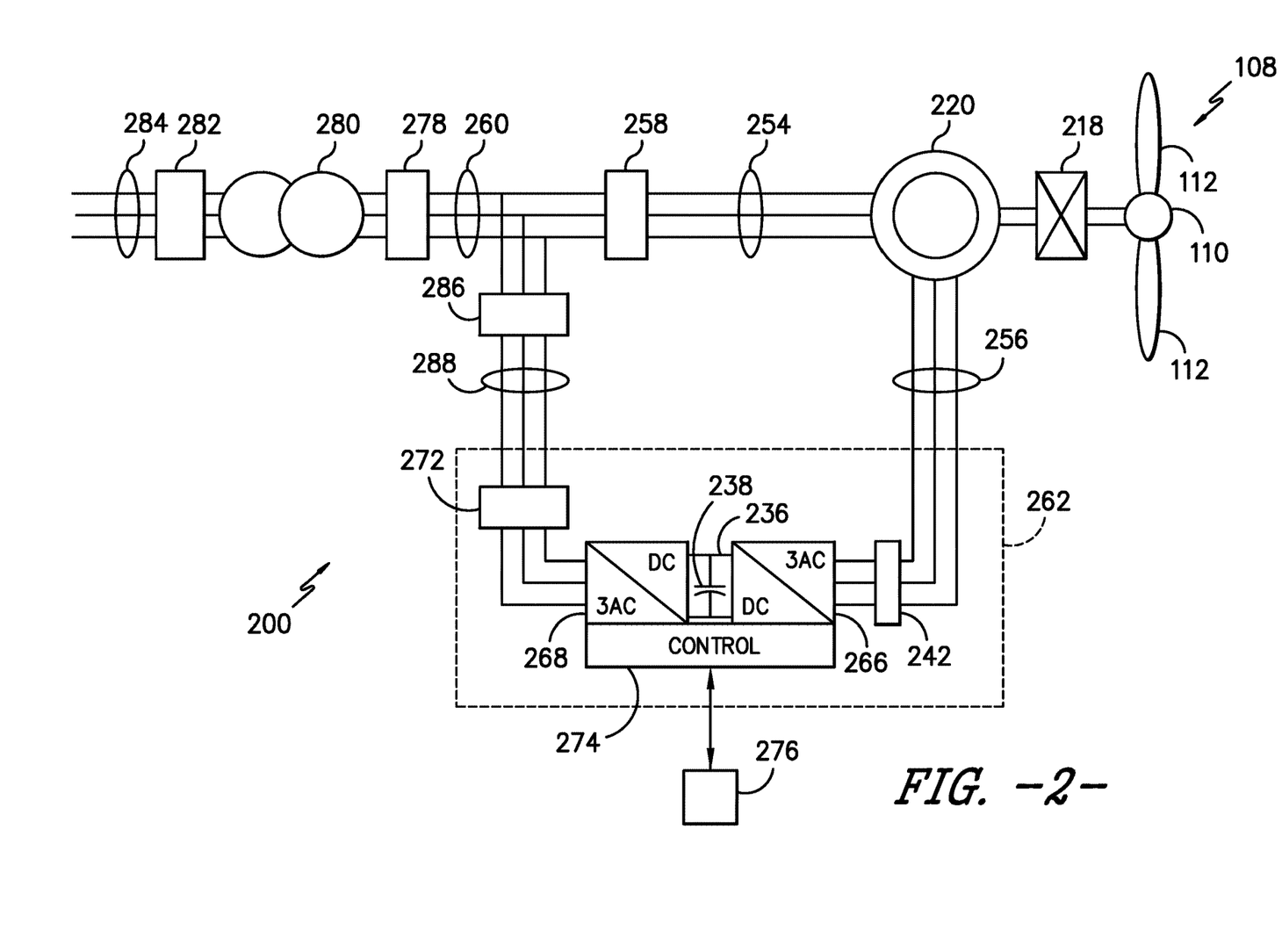
FIG. 2 illustrates a schematic diagram of one embodiment of a DFIG wind turbine system according to the present disclosure.

Referring now to FIG. 2, a schematic diagram of one embodiment of a DFIG wind turbine system 200 is illustrated in accordance with aspects of the present subject matter. It should be appreciated that the present subject matter will generally be described herein with reference to the system 200 shown in FIG. 2. However, those of ordinary skill in the art, using the disclosures provided herein, should understand that aspects of the present disclosure may also be applicable in other power generation systems.

Figure 5:
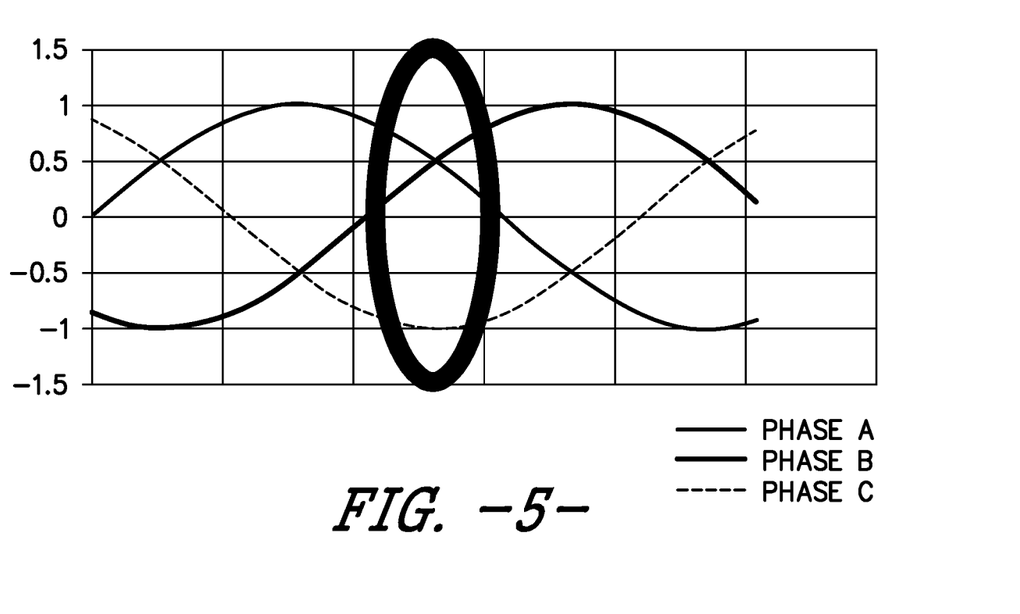
FIG. 5 illustrates a sinusoidal graph of multiple phase currents entering and exiting terminals of a power converter according to the present disclosure.

As shown, the rotor 108 of the wind turbine 100 may, optionally, be coupled to a gear box 218, which is, in turn, coupled to a generator 220. In accordance with aspects of the present disclosure, the generator 220 is a doubly-fed induction generator (DFIG). For example, as shown, the DFIG 220 may be coupled to a stator bus 254 and a power converter 262 via a rotor bus 256. The stator bus 254 may provide an output multiphase power (e.g. three-phase power) from a stator of the DFIG 220 and the rotor bus 256 may provide an output multiphase power (e.g. three-phase power) from a rotor of the DFIG 120. As shown in FIG. 5, the power converter 262 includes a rotor side converter 266 and a line side converter 268. The DFIG 220 may be coupled via the rotor bus 256 to the rotor side converter 266. Additionally, the rotor side converter 266 may be coupled to the line side converter 268 which may, in turn, be coupled to a line side bus 288. In particular embodiments, the power converter 262 may be a multi-level bridge power converter, such as a three-level bridge power converter, or higher. As described herein, three-level converters are converters that have three direct current (DC) poles. In addition to positive and negative DC poles, such converters also have a neutral DC pole.

In several embodiments, the rotor side converter 266 and the line side converter 128 may be configured for normal operating mode in a three-phase, pulse width modulation (PWM) arrangement using insulated gate bipolar transistor (IGBT) switching elements as will be discussed in more detail with respect to FIG. 3. The rotor side converter 126 and the line side converter 268 may be coupled via a DC link 126 across which is a DC link capacitor 238.

In addition, the power converter 262 may be coupled to a controller 274 in order to control the operation of the rotor side converter 266 and the line side converter 268. It should be noted that the controller 124 may, in several embodiments, be configured as an interface between the power converter 262 and a control system 276. The controller 274 may include any number of control devices. In one embodiment, the controller 274 may include a processing device (e.g. microprocessor, microcontroller, etc.) executing computer-readable instructions stored in a computer-readable medium. The instructions when executed by the processing device may cause the processing device to perform operations, including providing control commands to the switching elements and/or the shorting devices of the power converter 262.

In typical configurations, various line contactors and circuit breakers including, for example, a grid breaker 282 may also be included for isolating the various components as necessary for normal operation of the DFIG 220 during connection to and disconnection from the electrical grid 284. For example, a system circuit breaker 278 may couple the system bus 260 to a transformer 280, which may be coupled to the electrical grid 284 via the grid breaker 282. In alternative embodiments, fuses may replace some or all of the circuit breakers.

In operation, alternating current power generated at the DFIG 220 by rotating the rotor 108 is provided via a dual path to the electrical grid 284. The dual paths are defined by the stator bus 254 and the rotor bus 256. On the rotor bus side 256, sinusoidal multi-phase (e.g. three-phase) alternating current (AC) power is provided to the power converter 262. The rotor side power converter 266 converts the AC power provided from the rotor bus 256 into direct current (DC) power and provides the DC power to the DC link 236.

As is generally understood, switching elements (e.g. IGBTs) used in the bridge circuits of the rotor side power converter 266 may be modulated to convert the AC power provided from the rotor bus 256 into DC power suitable for the DC link 236.

In addition, the line side converter 268 converts the DC power on the DC link 126 into AC output power suitable for the electrical grid 124. In particular, switching elements (e.g. IGBTs) used in bridge circuits of the line side power converter 268 can be modulated to convert the DC power on the DC link 236 into AC power on the line side bus 288. The AC power from the power converter 262 can be combined with the power from the stator of DFIG 220 to provide multi-phase power (e.g. three-phase power) having a frequency maintained substantially at the frequency of the electrical grid 284 (e.g. 50 Hz or 60 Hz).

Additionally, various circuit breakers and switches, such as grid breaker 282, system breaker 278, stator sync switch 258, converter breaker 286, and line contactor 272 may be included in the system 200 to connect or disconnect corresponding buses, for example, when current flow is excessive and may damage components of the wind turbine system 100 or for other operational considerations. Additional protection components may also be included in the wind turbine system 200, such as the crowbar circuit described below.

Moreover, the power converter 262 may receive control signals from, for instance, the control system 276 via the controller 274. The control signals may be based, among other things, on sensed conditions or operating characteristics of the wind turbine system 200. Typically, the control signals provide for control of the operation of the power converter 262. For example, feedback in the form of a sensed speed of the DFIG 220 may be used to control the conversion of the output power from the rotor bus 256 to maintain a proper and balanced multi-phase (e.g. three-phase) power supply. Other feedback from other sensors may also be used by the controller 274 to control the power converter 262, including, for example, stator and rotor bus voltages and current feedbacks. Using the various forms of feedback information, switching control signals (e.g. gate timing commands for IGBTs), shorting control signals, stator synchronizing control signals, and circuit breaker signals may be generated.

Figure 3:
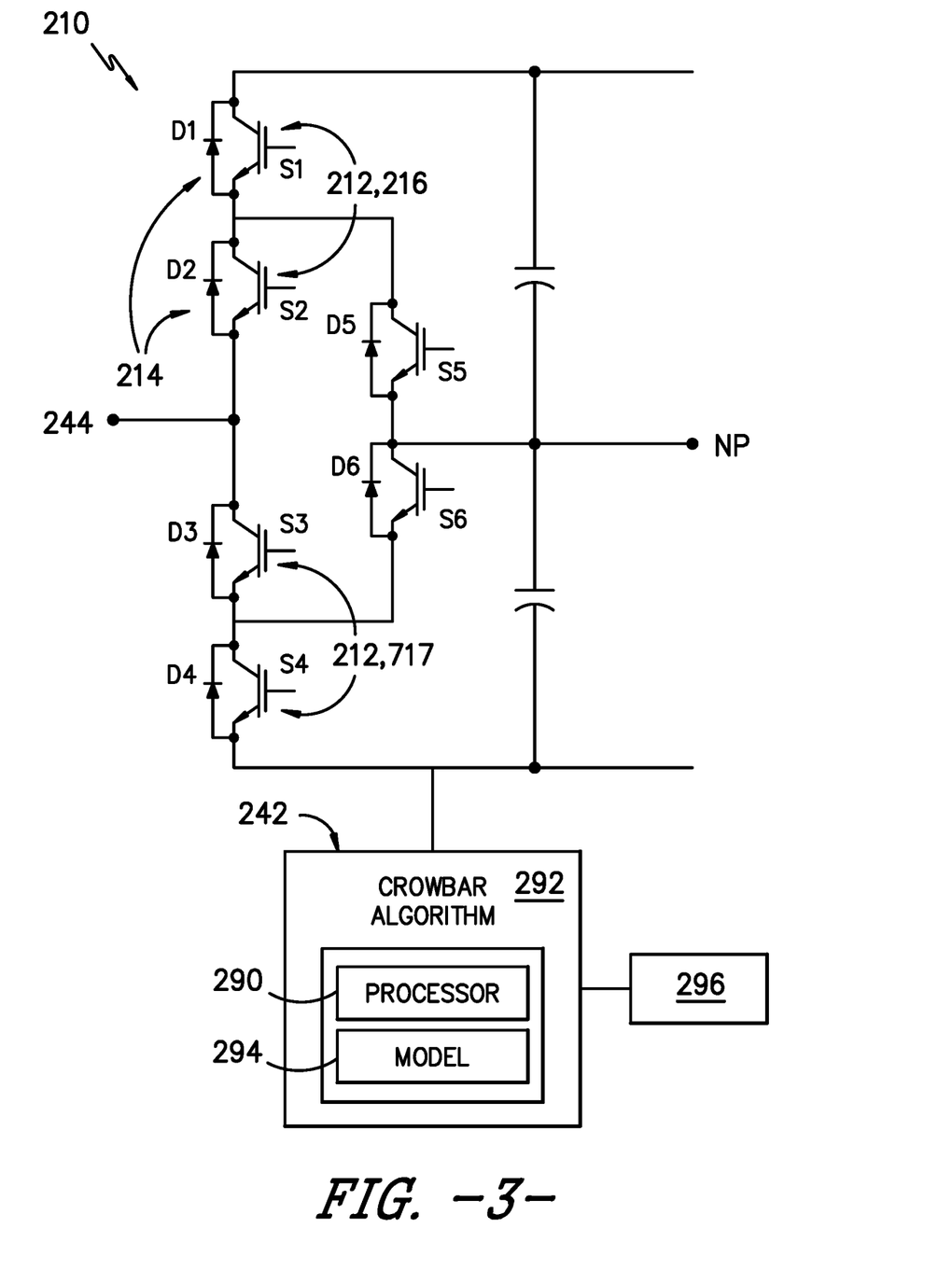
FIG. 3 illustrates a schematic diagram of one embodiment of a single phase main circuit of a switching branch of a power converter according to the present disclosure.

Referring now to FIG. 3, a schematic diagram of a single phase main circuit 210 of a switching branch of the power converter 262 shown in FIG. 2 is illustrated in accordance with aspects of the present subject matter. As shown, the switching branch may be part of the rotor side converter 266 or the line side converter 268. Furthermore, as shown, the main circuit 210 has an active neutral point clamped topology. As described herein, an active neutral point clamped topology generally refers to a topology having six diodes 214 (e.g. D1 to D6) and six controllable semiconductor switches 212 (e.g. S1 to S6). More particularly, as shown in FIG. 3, the switching devices 212 may include, at least, a first set of middle point switching devices 216 and a second set of middle point switching devices 217. A converter comprising one or more switching branches, like that of FIG. 3, may operate as a rectifier or as an inverter. In addition, it should be understood that each phase of the rotor bus 256 or the stator bus 288 may be coupled to a circuit with the same topology as the main circuit 210.

Further, as shown, the main circuit 210 includes a plurality of switching elements 212 (e.g. IGBTs) coupled together. A diode 214 may also be coupled in parallel with each of the IGBTs 212. The line side converter 268 and the rotor side converter 266 are controlled, for instance, by providing control commands, using a suitable driver circuit, to the gates of the IGBTs 212. For example, in an embodiment, the controller 274 can provide suitable gate timing commands to the gates of the IGBTs 212 of the main circuit 210. Thus, the control commands can control the pulse width modulation of the IGBTs to provide a desired output. In one embodiment, the main circuit 210 may be controlled according to a substantially non-interleaved switching pattern such that the switching elements of the main circuit 210 are switched in phase with one another. In other embodiments, the main circuit 210 may be controlled according to any other suitable switching pattern. It will be appreciated by those of ordinary skill in the art that other suitable switching elements can be used in place of IGBTs.

Additionally, as shown in FIG. 3, a plurality of rotor inductors 240 may be coupled in series with bridge outputs of each of the plurality of bridge circuits of the rotor side converter 266. In particular, the rotor inductors 240 may be coupled in series with the bridge outputs of the bridge circuits before the bridge outputs are paralleled together to provide the parallel bridge circuits. As a result, the rotor inductors 240 are effectively coupled between the parallel bridge circuits. The rotor inductors 240 may generally be any suitable inductive elements, such as elements that include coils of conductor and/or iron cores. For example, the rotor inductors 240 may be as simple as lengths of wire, which naturally include inductance and resistance.

Moreover, as shown in FIGS. 2 and 3, the power converter 262 may also include a crowbar module 242 configured to provide a short circuit to prevent excess power from flowing to the power converter 262. In particular, the crowbar module 242 may be utilized with the active neutral point clamped power converter 262 described herein. It should be further understood that the crowbar module 242 may be part of the converter controller 274, the turbine controller 276, or may be a separate control module. Further, as shown in FIGS. 2 and 3, the crowbar module 242 is a separate module having a controller with at least one processor 290 that is communicatively coupled to the converter controller 274 and/or the turbine controller 276. Alternatively, as mentioned, the crowbar module 242 may be part of the converter controller 274 and/or the turbine controller 276 such that no additional hardware is needed.

Figure 4:
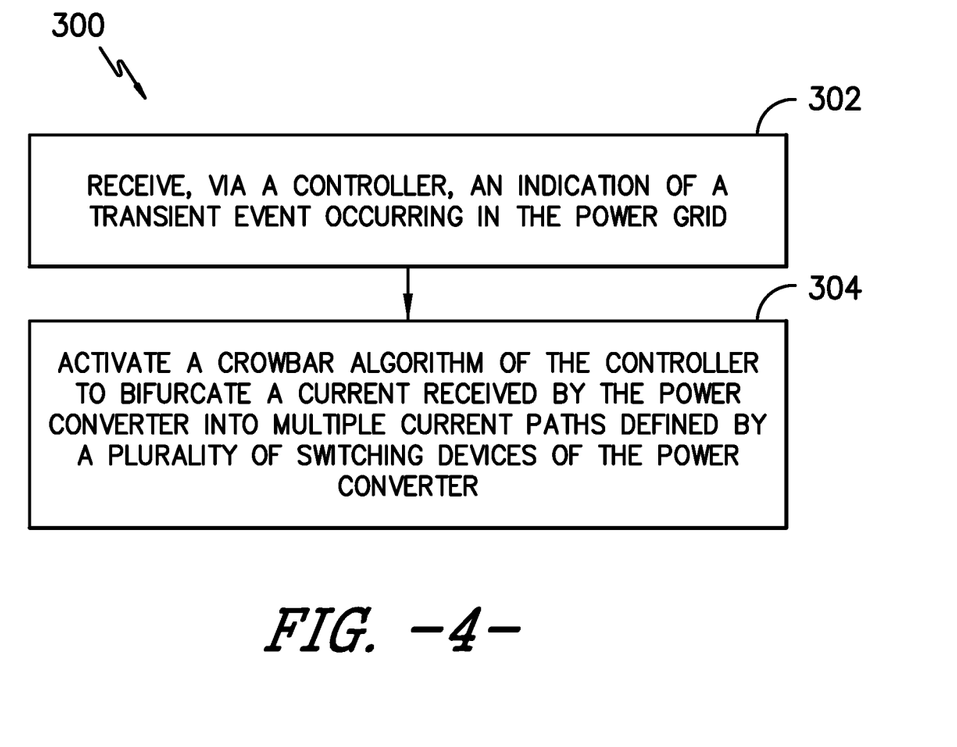
FIG. 4 illustrates a flow diagram of one embodiment of a method for operating a multi-level bridge power converter of an electrical power system connected to a power grid according to the present disclosure.

More specifically, referring now to FIG. 4, a flow diagram of one embodiment of a method 300 for operating a multi-level bridge power converter is illustrated in accordance with aspects of the present subject matter. In general, the method 300 will be described herein as being implemented using a wind turbine system, such as the DFIG wind turbine system 200 described above with reference to FIGS. 2 and 3. However, it should be appreciated that the disclosed method 300 may be implemented using any other suitable power generation system that is configured to supply power for application to a load. In addition, although FIG. 4 depicts steps performed in a particular order for purposes of illustration and discussion, the methods described herein are not limited to any particular order or arrangement. One skilled in the art, using the disclosures provided herein, will appreciate that various steps of the methods can be omitted, rearranged, combined and/or adapted in various ways.

Figure 6A:
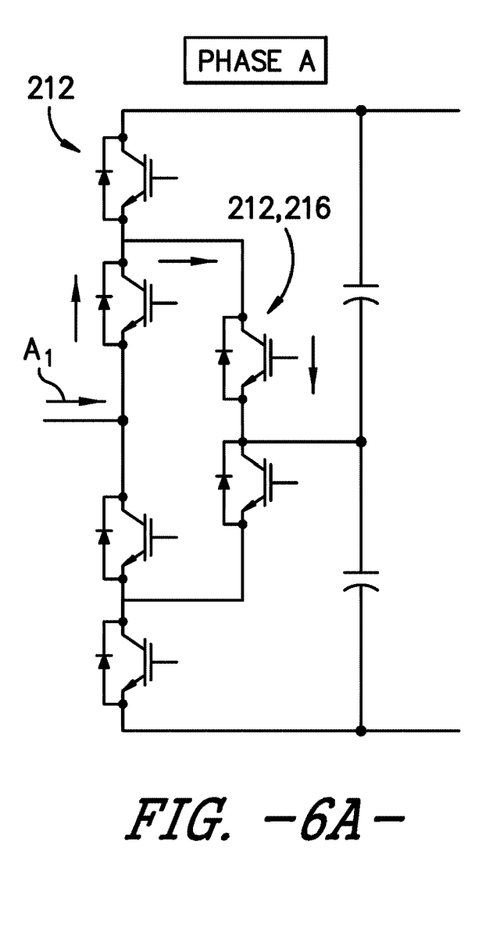
FIGS. 6A-6C illustrate schematic diagrams of one embodiment of a first current path for a three phase circuit of a switching branch of a power converter according to the present disclosure.
Figure 6B:
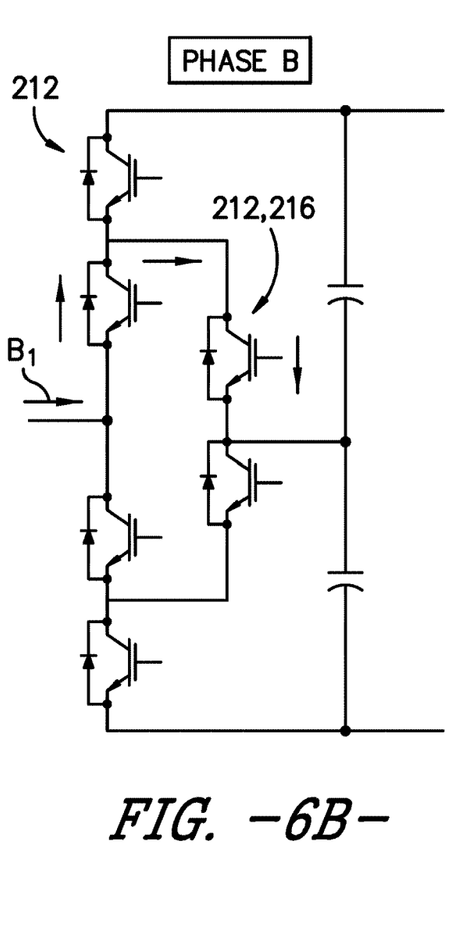
Figure 6C:
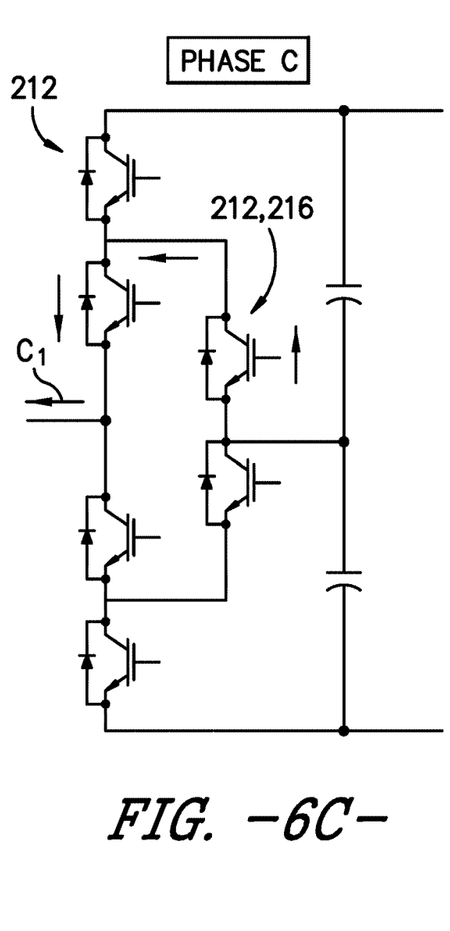

As shown at (302), the method 300 also includes receiving, via a controller, an indication of a transient event occurring in the power grid or the electrical power system. Upon receiving the indication, as shown at (304), the method 300 includes activating a crowbar algorithm 292 of the controller to bifurcate a current received by the power converter 262 into multiple current paths defined by plurality of switching devices of the power converter 262. For example, in an embodiment, as shown in FIGS. 5-7C, once activated, the crowbar algorithm 292 may be configured to direct the current through, at least, a first current path defined by the first set of middle point switching devices 216. In particular, FIG. 5 illustrates a graph of sinusoidal currents for three phases (namely, Phase A, Phase B, and Phase C), where a positive current value indicates current entering the bridge and a negative current value indicates current exiting the bridge. Thus, as shown in FIGS. 6A-6C, once activated, the crowbar algorithm 292 is configured to direct the current through the phase modules as shown via current paths A1, B1, and C1, respectively (as indicated via the arrows).

In another embodiment, the method 300 may include switching directing of the current between the first and second sets of middle point switching devices 216, 217 based on the temperature. For example, in an embodiment, the crowbar algorithm 292 can then monitor a temperature of the first set of middle point switching devices 216 and compare the temperature to a temperature threshold. For example, in an embodiment, the method 300 may include generating a model of the first and second sets of middle point switching devices 216, 217 as a function of one or more electrical conditions, physical parameters, and/or time. More particularly, as shown in FIG. 3, the crowbar algorithm 292 may be configured to generate the model 294 of the switching devices 216, 217 using various parameter received, as an example, from one or more sensors 296. Thus, in such embodiments, the crowbar algorithm 292 can determine the temperature of the first or second sets of middle point switching devices 216, 217 using the model 294. In further embodiments, the method 300 may include monitoring the temperature of the first or second sets of middle point switching devices 216, 217 directly via the sensor(s) 296.

In alternative embodiments, activating the crowbar algorithm 292 to bifurcate the current received by the power converter 262 into multiple current paths defined by plurality of switching devices may include directing the current through the first and second current paths simultaneously, which reduces the risk of overheating by sharing the current between the two paths.

Figure 7A:
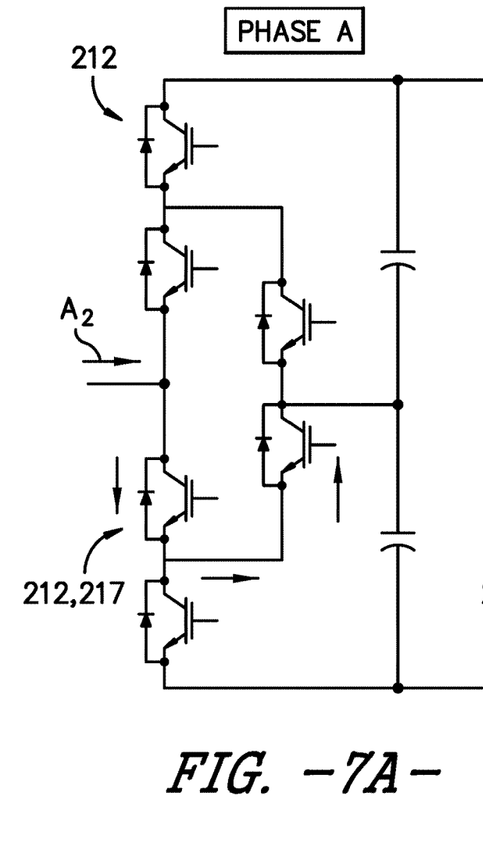
FIGS. 7A-7C illustrate schematic diagrams of one embodiment of a second current path for a three phase circuit of a switching branch of a power converter according to the present disclosure.
Figure 7B:
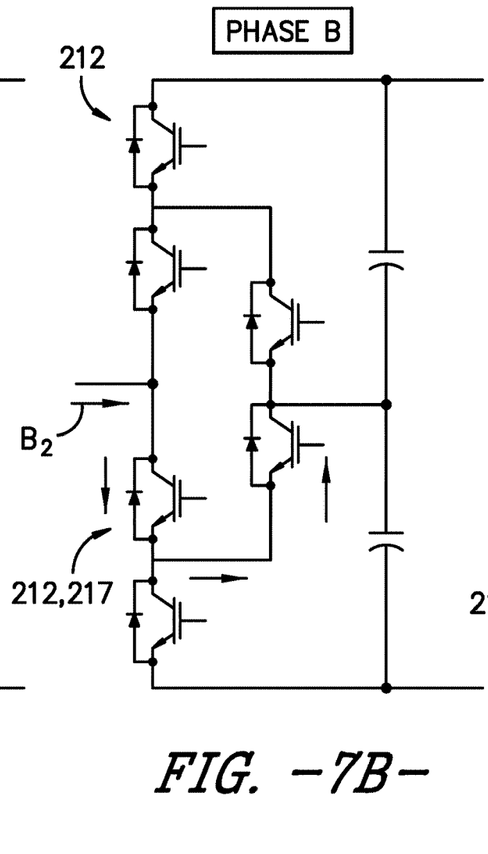
Figure 7C:
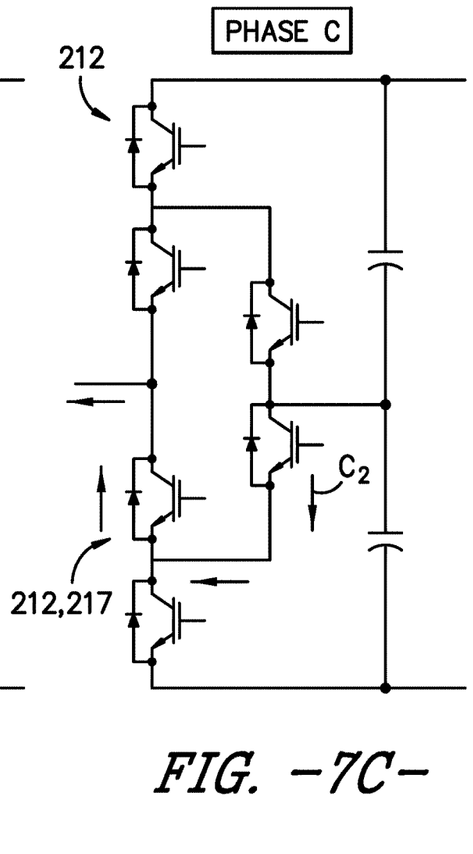

Referring now to FIGS. 7A-7C, when the temperature exceeds the temperature threshold, the crowbar algorithm 292 can then direct the current through a second current path defined by the second set of middle point switching devices 217, e.g. as shown via current paths A2, B2, and C2, respectively (as indicated via the arrows). Thus, as shown in FIGS. 6A-7C, the first and second current paths each include different switching devices of the plurality of switching devices. Accordingly, this bifurcation of current is only possible with an ANPC topology (as opposed to a regular NPC topology with diodes instead of transistors on some of the devices).

Further aspects of the invention are provided by the subject matter of the following clauses:

Clause 1. A method for operating a multi-level bridge power converter of an electrical power system connected to a power grid, the power converter comprising a first converter coupled to a second converter via a DC link, the power converter having a plurality of switching devices arranged in an active neutral point clamped topology, the method comprising:

receiving, via a controller of the power converter, an indication of a transient event occurring in the power grid or the electrical power system; and, upon receiving the indication, activating a crowbar algorithm programmed in the controller of the power converter to bifurcate a current received by the power converter into a plurality of different current paths defined by the plurality of switching devices.

Clause 2. The method of clause 1, wherein the plurality of switching devices comprises, at least, a first set of middle point switching devices and a second set of middle point switching devices.

Clause 3. The method of clauses 1-2, wherein the plurality of switching devices comprise insulated gate bipolar transistors (IGBTs).

Clause 4. The method of clause 2, wherein activating the crowbar algorithm programmed in the controller of the power converter to bifurcate the current received by the power converter into multiple current paths defined by plurality of switching devices further comprises:

directing the current through a first current path defined by the first set of middle point switching devices;

monitoring a temperature of the first set of middle point switching devices; comparing the temperature to a temperature threshold; and directing the current through a second current path defined by the second set of middle point switching devices when the temperature exceeds the temperature threshold.

Clause 5. The method of clause 4, wherein the first and second current paths each comprise different switching devices of the plurality of switching devices.

Clause 6. The method of clause 4, further comprising switching directing of the current between the first and second sets of middle point switching devices based on the temperature.

Clause 7. The method of clause 4, further comprising:

generating, via the controller, a model of the first and second sets of middle point switching devices as a function of one or more electrical conditions, physical parameters, or time; and determining the temperature of the first or second sets of middle point switching devices using the model.

Clause 8. The method of clause 4, further comprising monitoring the temperature of the first or second sets of middle point switching devices via one or more sensors.

Clause 9. The method of clause 2, wherein activating the crowbar algorithm programmed in the controller of the power converter to bifurcate the current received by the power converter into multiple current paths defined by plurality of switching devices further comprises:

directing the current through a first current path defined by the first set of middle point switching devices and a second current path defined by the second set of middle point switching devices simultaneously.

Clause 10. The method of any of the preceding clauses, wherein the multi-level bridge power converter comprises at least a three-level bridge power converter.

Clause 11. The method of any of the preceding clauses, wherein the electrical power system comprises a wind turbine power system, a solar power system, an energy storage power system or combinations thereof.

Clause 12. An electrical power system, comprising:

a doubly-fed induction generator having a rotor and a stator, the stator providing AC power to a stator bus;

a multi-level bridge power converter coupled to the rotor of the doubly-fed induction generator, the power converter comprising a first converter coupled to a second converter via a DC link, at least one of the first converter or the second converter comprising a plurality of switching devices arranged in an active neutral point clamped topology;

a controller communicatively coupled to the power converter, the controller comprising at least one processor configured to implement a crowbar algorithm comprising a plurality of operations, the plurality of operations comprising: receiving an indication of a transient event occurring in the power grid or the electrical power system; and, upon receiving the indication, bifurcating a current received by the power converter into a plurality of different current paths defined by the plurality of switching devices.

Clause 13. The electrical power system of clause 12, wherein the plurality of switching devices comprises, at least, a first set of middle point switching devices and a second set of middle point switching devices.

Clause 14. The electrical power system of clause 13, wherein bifurcating the current received by the power converter into the plurality of different current paths defined by the plurality of switching devices further comprises:

directing the current through a first current path defined by the first set of middle point switching devices;

monitoring a temperature of the first set of middle point switching devices;

comparing the temperature to a temperature threshold; and directing the current through a second current path defined by the second set of middle point switching devices when the temperature exceeds the temperature threshold.

Clause 15. The electrical power system of clause 14, wherein the first and second current paths each comprise different switching devices of the plurality of switching devices.

Clause 16. The electrical power system of clause 14, wherein bifurcating the current received by the power converter into the plurality of different current paths defined by the plurality of switching devices further comprises switching directing of the current between the first and second sets of middle point switching devices based on the temperature.

Clause 17. The electrical power system of clause 14, wherein the plurality of operations further comprise:

generating a model of the first and second sets of middle point switching devices as a function of one or more electrical conditions, physical parameters, or time; and determining the temperature of the first or second sets of middle point switching devices using the model.

Clause 18. The electrical power system of clause 14, wherein the plurality of operations further comprise monitoring the temperature of the first or second sets of middle point switching devices via one or more sensors.

Clause 19. The electrical power system of clauses 12-18, wherein the multi-level bridge power converter comprises at least a three-level bridge power converter.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for operating a multi-level bridge power converter of an electrical power system connected to a power grid, the power converter comprising a first converter coupled to a second converter via a DC link, the power converter having a plurality of switching devices arranged in an active neutral point clamped topology, the plurality of switching devices comprising a first set of middle point switching devices and a second set of middle point switching devices, the method comprising:
   receiving, via a controller of the power converter, an indication of a transient event occurring in the power grid or the electrical power system; and
   upon receiving the indication, activating a crowbar algorithm programmed in the controller of the power converter to bifurcate a current received by the power converter into a plurality of different current paths defined by the plurality of switching devices, the plurality of different current paths comprising at least a first current path defined by the first set of middle point switching devices and a second current path defined by the second set of middle point switching devices, wherein each of the first and second sets of middle point switching devices include at least two middle point switching devices coupled together in series, wherein each middle point switching device in the first set of middle point switching devices is different from each middle point switching device in the second set of middle point switching devices,
   wherein activating the crowbar algorithm programmed in the controller of the power converter to bifurcate the current received by the power converter into multiple current paths defined by the plurality of switching devices further comprises:
      generating, via the controller, a model of the first and second sets of middle point switching devices as a function of at least two or more of electrical conditions, physical parameters, and time;
      determining a temperature of the first or second sets of middle point switching devices using the model; and
      switching directing of the current between the first current path defined by the first set of middle point switching devices and the second current path defined by the second set of middle point switching devices based on the temperature.

2. The method of claim 1, wherein the plurality of switching devices comprise insulated gate bipolar transistors (IGBTs).

3. The method of claim 1, wherein activating the crowbar algorithm programmed in the controller of the power converter to bifurcate the current received by the power converter into multiple current paths defined by the plurality of switching devices further comprises:
   directing the current through the first current path defined by the first set of middle point switching devices;
   monitoring the temperature of the first set of middle point switching devices;
   comparing the temperature to a temperature threshold; and
   directing the current through the second current path defined by the second set of middle point switching devices when the temperature exceeds the temperature threshold.

4. The method of claim 3, further comprising monitoring the temperature of the first or second sets of middle point switching devices via one or more sensors.

5. The method of claim 1, wherein activating the crowbar algorithm programmed in the controller of the power converter to bifurcate the current received by the power converter into multiple current paths defined by the plurality of switching devices further comprises:
   directing the current through the first current path defined by the first set of middle point switching devices and the second current path defined by the second set of middle point switching devices simultaneously.

6. The method of claim 1, wherein the multi-level bridge power converter comprises at least a three-level bridge power converter.

7. The method of claim 1, wherein the electrical power system comprises a wind turbine power system, a solar power system, an energy storage power system or combinations thereof.

8. An electrical power system, comprising:
   a doubly-fed induction generator having a rotor and a stator, the stator providing AC power to a stator bus;
   a multi-level bridge power converter coupled to the rotor of the doubly-fed induction generator, the power converter comprising a first converter coupled to a second converter via a DC link, at least one of the first converter or the second converter comprising a plurality of switching devices arranged in an active neutral point clamped topology, the plurality of switching devices comprising a first set of middle point switching devices and a second set of middle point switching devices, wherein each middle point switching device in the first set of middle point switching devices is different from each middle point switching device in the second set of middle point switching devices;
   a controller communicatively coupled to the power converter, the controller comprising at least one processor configured to implement a crowbar algorithm comprising a plurality of operations, the plurality of operations comprising:
      receiving an indication of a transient event occurring in the power grid or the electrical power system; and
      upon receiving the indication, bifurcating a current received by the power converter into a plurality of different current paths defined by the plurality of switching devices, the plurality of different current paths comprising at least a first current path defined by the first set of middle point switching devices and a second current path defined by the second set of middle point switching devices, wherein each of the first and second sets of middle point switching devices include at least two middle point switching devices coupled together in series;
   wherein bifurcating the current received by the power converter into the plurality of different current paths defined by the plurality of switching devices further comprises:
      generating a model of the first and second sets of middle point switching devices as a function of at least two or more of electrical conditions, physical parameters, and time;
      determining a temperature of the first or second sets of middle point switching devices using the model; and
      switching directing of the current between the first current path defined by the first set of middle point switching devices and the second current path defined by the second set of middle point switching devices based on the temperature.

9. The electrical power system of claim 8, wherein bifurcating the current received by the power converter into the plurality of different current paths defined by the plurality of switching devices further comprises:
   directing the current through the first current path defined by the first set of middle point switching devices;
   monitoring the temperature of the first set of middle point switching devices;
   comparing the temperature to a temperature threshold; and
   directing the current through the second current path defined by the second set of middle point switching devices when the temperature exceeds the temperature threshold.

10. The electrical power system of claim 9, wherein the plurality of operations further comprise monitoring the temperature of the first or second sets of middle point switching devices via one or more sensors.

11. The electrical power system of claim 8, wherein the multi-level bridge power converter comprises at least a three-level bridge power converter.

* * * * *